(12) United States Patent
Xiaozhuo et al.

(10) Patent No.: US 9,116,668 B2
(45) Date of Patent: Aug. 25, 2015

(54) PANEL PROTECTING DEVICE OF FLAT PANEL ELECTRONIC DEVICE AND FLAT PANEL ELECTRONIC DEVICE

(71) Applicant: NVIDIA Corporation, Santa Clara, CA (US)

(72) Inventors: Cai Xiaozhuo, Shenzhen (CN); Yan Shuanghu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 13/911,000

(22) Filed: Jun. 5, 2013

(65) Prior Publication Data
US 2014/0133072 A1 May 15, 2014

(30) Foreign Application Priority Data
Nov. 9, 2012 (CN) .......................... 2012 1 0447000

(51) Int. Cl.
*G06F 1/16* (2006.01)

(52) U.S. Cl.
CPC ............ *G06F 1/1656* (2013.01); *G06F 1/1626* (2013.01)

(58) Field of Classification Search
CPC ................................ F16F 15/00; F16F 15/04
See application file for complete search history.

(56) References Cited

U.S. PATENT DOCUMENTS 7,059,182 B1 *  6/2006  Ragner ........................... 73/200
8,330,305 B2 * 12/2012  Hart et al. ..................... 307/650
8,749,958 B2 *  6/2014  Li ............................. 361/679.02
8,862,182 B2 * 10/2014  Shukla et al. ............... 455/556.1

(Continued)

FOREIGN PATENT DOCUMENTS

DE         10101039 A1    7/2001
TW       201037486 A     10/2010

(Continued)

OTHER PUBLICATIONS

Examination Report from German Application No. 10 2013 221 596.7, dated Apr. 14, 2015.

*Primary Examiner* — Anthony Q Edwards
(74) *Attorney, Agent, or Firm* — Zilka-Kotab, PC

(57) ABSTRACT

The present invention provides a panel protecting device of a flat panel electronic device and a flat panel electronic device. The panel protecting device comprises: a sensor for detecting one or more of a falling speed, a falling time and a falling distance of the flat panel electronic device in a vertical direction when the flat panel electronic device is only under gravity; and a protecting means for being mounted around a panel of the flat panel electronic device. The protecting means has a rest position and a protruding position. The protecting means is accommodated in a recess of the flat panel electronic device when the protecting means is in the rest position and protrudes from the panel when the protecting means is in the protruding position. The protecting means moves to the protruding position from the rest position automatically when the one or more of the falling speed, the falling time and the falling distance is greater than or equal to a predetermined value. The panel protecting device of the flat panel electronic device provided by the present invention is able to protrude the protecting means automatically when the movement of the panel protecting device is determined to be the accidental falling, so as to prevent the panel from contacting with the ground and further avoid the damage of the panel.

12 Claims, 3 Drawing Sheets

(56) References Cited

U.S. PATENT DOCUMENTS

2010/0164152 A1 7/2010 Li
2011/0194230 A1 8/2011 Hart et al.

FOREIGN PATENT DOCUMENTS

TW 201205360 A 2/2012
TW M437986 U 9/2012

* cited by examiner

PANEL PROTECTING DEVICE OF FLAT PANEL ELECTRONIC DEVICE AND FLAT PANEL ELECTRONIC DEVICE

CROSS-REFERENCE TO RELATED APPLICATIONS

This application claims priority to Chinese Patent Application No. 201210447000.7, filed on Nov. 9, 2012, which is hereby incorporated by reference in its entirety.

FIELD OF INVENTION

The present invention relates generally to the electrics field, in particular, to a panel protecting device of a flat panel electronic device and a flat panel electronic device with the panel protecting device.

BACKGROUND

With the improved requirement on the flat panel electronic device (for example, a tablet, a flat panel mobile phone such as iphone, etc.), the performance of the panel (including the material, resolution and dimension of the panel as well as the sensitivity of the touch panel) is one of the main factors concerned by the designer and the user. The higher performance of the panel implies the higher cost. But the panel is the most vulnerable component in use due to its fragility.

Therefore, there is a need of providing a panel protecting device of a flat panel electronic device and a flat panel electronic device with the panel protecting device to solve the above problem in the prior art.

SUMMARY OF THE INVENTION

In order to solve the above problem, according to one aspect of the present invention, a panel protecting device of a flat panel electronic device is provided, which comprises: a sensor for detecting one or more of a falling speed, a falling time and a falling distance of the flat panel electronic device in a vertical direction when the flat panel electronic device is only under gravity; and a protecting means for being mounted around a panel of the flat panel electronic device. The protecting means has a rest position and a protruding position. The protecting means is accommodated in a recess of the flat panel electronic device when the protecting means is in the rest position and protrudes from the panel when the protecting means is in the protruding position. The protecting means moves to the protruding position from the rest position automatically when the one or more of the falling speed, the falling time and the falling distance is greater than or equal to a predetermined value.

Preferably, the protecting means comprises a moving member, a spring and a position-limiting member, one end of the spring is connected to a bottom of the moving member and the other end of the spring is used for being connected to a bottom of the recess of the flat panel electronic device, the position-limiting member is configured to limit the position of the moving member when the protecting means is in the rest position, and release the moving member when the one or more of the falling speed, the falling time and the falling distance is greater than or equal to the predetermined value, and the spring is compressed when the protecting means is in the rest position so that the protecting means moves to the protruding position automatically as the moving member is released.

Preferably, a top surface of the moving member is a curved surface with a convex centre, and in an installed state, the curved surface is able to seal the recess of the flat panel electronic device when the protecting means is in the rest position.

Preferably, the protecting means comprises a locking member for locking the position of the protecting means when the protecting means is in the protruding position.

Preferably, the protecting means further comprises an unlocking member, and the unlocking member is connected to the locking member and operable to unlock the position of the protecting means.

Preferably, the predetermined value of the falling speed is 1.4-1.7 m/s.

Preferably, the predetermined value of the falling distance is 0.1-0.15 m.

Preferably, the predetermined value of the failing time is 0.14-0.17 s.

Preferably, the sensor is a gravity sensor.

Preferably, the height of the protecting means protruding beyond the panel is greater than or equal to 0.5 cm when the protecting means is in the protruding position.

Preferably, the panel protecting device comprises a plurality of protecting means, the panel protecting device further comprises a synchronous means, and the synchronous means is connected to the plurality of protecting means to control the plurality of protecting means to move synchronously.

Preferably, the panel protecting device comprises four protecting means located at four vertex angles of the panel respectively in an installed state.

According to another aspect of the present invention, a flat panel electronic device is further provided. A recess is disposed around the panel of the flat panel electronic device. The flat panel electronic device comprises a panel protecting device, which includes: a sensor disposed in the flat panel electronic device for detecting one or more of a falling speed, a falling time and a falling distance of the flat panel electronic device in a vertical direction when the flat panel electronic device is only under gravity; and a protecting means mounted in the recess of the flat panel electronic device. The protecting means has a rest position and a protruding position. The protecting means is accommodated in the recess of the flat panel electronic device when the protecting means is in the rest position and protrudes from the panel when the protecting means is in the protruding position. The protecting means moves to the protruding position from the rest position automatically when the one or more of the falling speed, the falling time and the falling distance is greater than or equal to a predetermined value.

Preferably, the protecting means comprises a moving member, a spring and a position-limiting member, one end of the spring is connected to a bottom of the moving member and the other end of the spring is connected to a bottom of the recess of the flat panel electronic device, the position-limiting member is configure to limit the position of the moving member when the protecting member is in the rest position and release the moving member when the one or more of the falling speed, the falling time and the falling distance is greater than or equal to the predetermined value, and the spring is compressed when the protecting means is in the rest position so that the protecting means moves to the protruding position automatically as the moving member is released.

Preferably, a top surface of the moving member is a curved surface with a convex centre and the curved surface is able to seal the recess of the flat panel electronic device when the protecting means is in the rest position.

Preferably, the protecting means comprises a locking member for locking the position of the protecting means when the protecting means is in the protruding position.

Preferably, the protecting means further comprises an unlocking member, and the unlocking member is connected to the locking member and operable to unlock the position of the protecting means.

Preferably, the sensor is a gravity sensor.

Preferably, the panel protecting device comprises a plurality of protecting means, the panel protecting device further comprises a synchronous means, and the synchronous means is connected to the plurality of protecting means to control the plurality of protecting means to move synchronously.

Preferably, the panel protecting device comprises four protecting means located at four vertex angles of the panel respectively.

The panel protecting device of the flat panel electronic device provided by the present invention is able to protrude the protecting means automatically when the movement of the panel protecting device is determined to be the accidental falling, so as to prevent the panel from contacting with the ground and further avoid the damage of the panel.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The following drawings of the present invention as a part of the present invention herein are used for understanding of the present invention, the embodiments and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Figure 1:
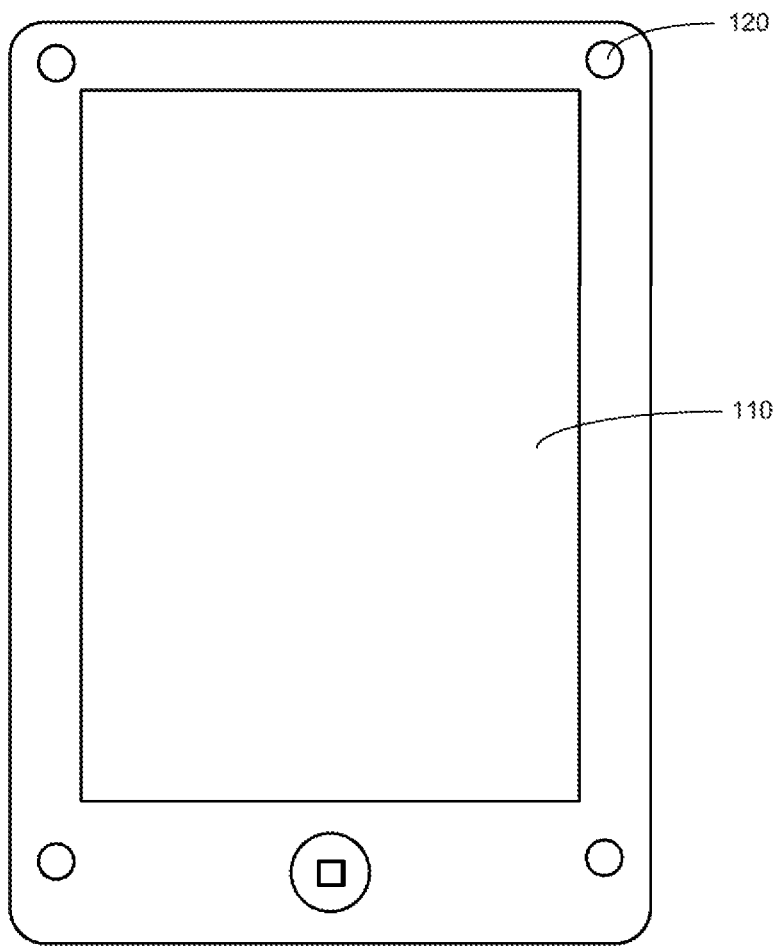
FIG. 1 is a schematic view of the flat panel electronic device according to one embodiment of the present invention.

According to one aspect of the present invention, a panel protecting device of a flat panel electronic device (hereinafter referred to as the panel protecting device) is provided. In order to generally understand the panel protecting device, the panel protecting device is firstly described in combination with FIG. 1 in the present invention. As shown in FIG. 1, the panel protecting device 120 is disposed around the panel 110 of the flat panel electronic device 100 to protect the panel 110 when the flat panel electronic device 100 falls accidentally.

Figure 2A:
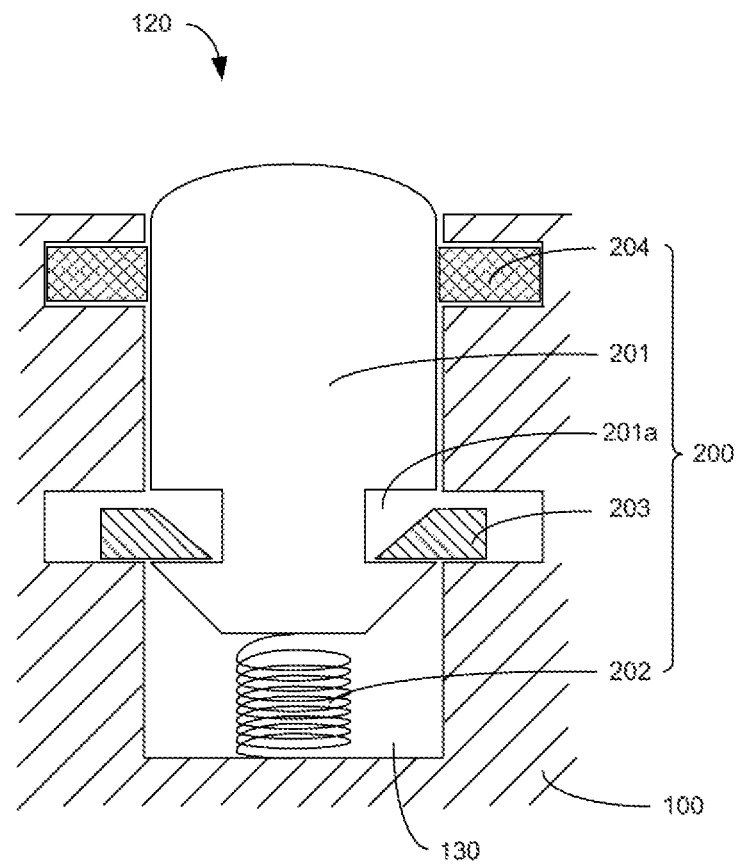
FIG. 2A is a sectional view of the panel protecting device mounted in the flat panel electronic device according to one embodiment of the present invention, wherein the protecting means is in the rest position.
Figure 2B:
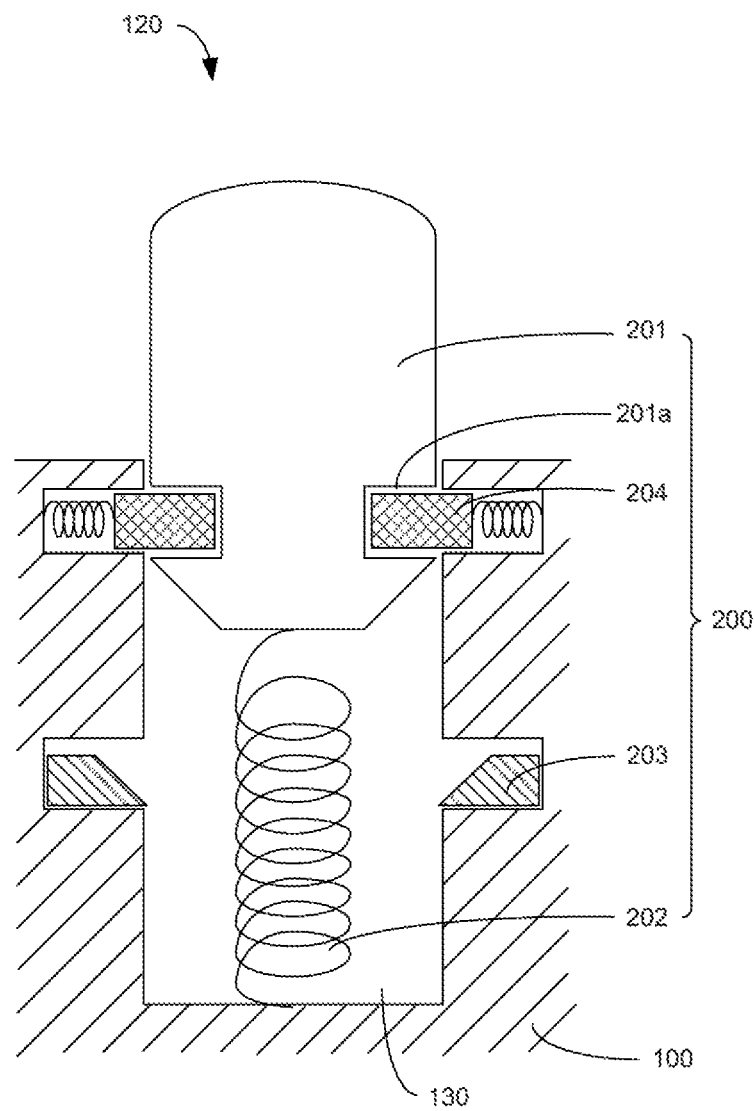
FIG. 2B is a sectional view of the panel protecting device mounted in the flat panel electronic device according to one embodiment of the present invention, wherein the protecting means is in the protruding position.

The panel protecting device 120 will be described in details below in combination with FIGS. 2A-2B. As shown in FIGS. 2A-2B, the panel protecting device 120 comprises a sensor (not shown) and a protecting means 200.

The sensor is used for detecting one or more of a falling speed, a falling time and a falling distance of the flat panel electronic device in a vertical direction when the flat panel electronic device is only under gravity. The flat panel electronic device moves in free fall or a parabola after falling. Therefore, it may be determined whether the flat panel electronic device is in falling by detecting whether the flat panel electronic device is only under gravity. In other words, it may be determined whether the flat panel electronic device is in a possible falling state by detecting whether the acceleration of the flat panel electronic device in the vertical direction is equal to the gravitational acceleration g. Therefore, a sensor may be applied to the panel protecting device 120 provided by the present invention if the sensor is able to detect the acceleration of an object in the vertical direction. Further, the flat panel electronic device may be only briefly under gravity when the user throws the flat panel electronic device intentionally, for example, throws the flat panel electronic device onto a desk or a sofa, etc. In order to distinguish the accidental falling of the flat panel electronic device, the sensor should have the function to detect one or more of the falling speed, the falling time and the falling distance of the flat panel electronic device in the vertical direction when the flat panel electronic device is only under gravity. The movement of the flat panel electronic device which is only under the gravity may be determined to be an accidental falling rather than an intentional throw of the user, when one or more of the falling speed, the falling time and the falling distance of the flat panel electronic device in the vertical direction is greater than or equal to a predetermined value.

The sensor may detect one or more of the falling speed, the falling time and the falling distance in the vertical direction when the flat panel electronic device is only under gravity. In the case that one of the falling speed, the falling time and the falling distance is detected, the movement of the flat panel electronic device may be determined to be the accidental falling when the detected physical parameter is greater than or equal to the corresponding predetermined value. In the case that two or three of the falling speed, the falling time and the falling distance are detected, the following schemes may be selected: 1) the movement of the flat panel electronic device is determined to be the accidental falling when only one of the detected physical parameter is greater than or equal to the corresponding predetermined value; 2) the movement of the flat panel electronic device is determined to be the accidental falling when all of the physical parameters detected are greater than or equal to the corresponding predetermined values. In the first scheme, the panel protecting device has higher sensitivity. In the second scheme, the accuracy of the determination is improved. Those skilled in the art may select the scheme reasonably as needed.

The predetermined value may be set by the user according to the personal conditions and the environmental conditions. The predetermined value may also be set as leaving factory. In view of the height of different users and the distance of the flat panel electronic device used under different postures from the ground, and in view of distinguishing from the intentional throw, it may be determined to be the accidental falling in the case that the falling distance in the vertical direction is greater than or equal to 0.1-0.15 m when the flat panel electronic device is only under gravity. Therefore, the predetermined value of the falling distance may be set as 0.1-0.15 m. According to different users, a reasonable value may be selected as the predetermined value of the falling distance from the range mentioned above.

Preferably, in view of the factors mentioned above, it may be determined to be the accidental falling in the case that the falling speed in the vertical direction is greater than or equal to 1.4-1.7 m/s when the flat panel electronic device is only under gravity. Therefore, the predetermined value of the falling speed may be set as 1.4-1.7 m/s. According to different users, a reasonable value may be selected as the predetermined value of the falling speed from the range mentioned above.

Preferably, in view of the factors mentioned above, it may be determined to be the accidental falling in the case that the falling time in the vertical direction is greater than or equal to 0.14-0.17 s when the flat panel electronic device is only under gravity. Therefore, the predetermined value of the falling time may be set as 0.14 s-0.17 s. According to different users, a reasonable value may be selected as the predetermined value of the falling time from the range mentioned above.

As an example, the sensor may be the combination of a sensor which is able to determine whether the flat panel electronic device is only under gravity and a sensor which is able to detect one or more of the falling speed, the falling time and the falling distance in the vertical direction. The sensor may be also a sensor with both the determining and detecting functions mentioned above. Preferably, the sensor is a gravity sensor. On the one hand, the gravity sensor has both the determining and detecting functions mentioned above. On the other hand, the gravity sensor belongs to a standard feature in the present flat panel electronic device. Therefore, it may reduce the cost by using the existing component of the flat panel electronic device as a part of the panel protecting device 120.

The protecting means 200 is used for being mounted around the panel 110 of the flat panel electronic device 100. In order to not affect the normal use of the flat panel electronic device and protect the panel 110 when the flat panel electronic device falls accidently, the protecting means 200 has a rest position and a protruding position. The protecting means 200 is in the rest position when the flat panel electronic device is used normally. That is, the protecting means 200 is accommodated in the recess 130 of the flat panel electronic device 100, referring to FIG. 2A. The protecting means 200 moves to the protruding position from the rest position automatically when the sensor detects that the flat panel electronic device is falling accidently. The protecting means 200 protrudes from the panel of the flat panel electronic device 100 (referring to FIG. 2B) when being in the protruding position. Thus, it is able to avoid that the panel contacts with the ground and then protect the panel from damage.

The protecting means 200 may be controlled by the sensor. The sensor directly controls the protecting means 200 to move to the protruding position from the rest position when the sensor detects that the flat panel electronic device is only under gravity and one or more of the falling speed, the falling time and the falling distance is greater than or equal to the predetermined value. Alternatively, the protecting means 200 may also be controlled by the main control unit of the flat panel electronic device 100. The main control unit receives the detecting signal from the sensor and controls the action of the protecting means 200 according to the detecting signal.

According to one preferred embodiment of the present invention, the protecting means 200 may comprise a moving member 201, a spring 202 and a position-limiting member 203. The protecting means 200 will be described in details below in combination with FIGS. 2A-2B.

One end of the spring 202 is connected to the bottom of the moving member 201 and the other end of the spring 202 is used for being connected to the bottom of the recess 130 of the flat panel electronic device 100.

The position-limiting member 203 is configured to limit the position of the moving member 201 when the protecting means 200 is in the rest position and release the moving member 201 when the movement of the flat panel electronic device is determined to be the accidental falling. As mentioned above, the determination that whether the movement of the flat panel electronic device 100 belongs to the accidental falling may be fulfilled by determining one or more of the falling speed, the falling time and the falling distance in the vertical direction is greater than the predetermined value when the flat panel electronic device 100 is only under gravity. The position-limiting member 203 may receive the signal from the sensor directly and be controlled by the sensor directly. Alternatively, the position-limiting member 203 may be controlled by the main control unit when the sensor sends the detecting signal to the main control unit of the flat panel electronic device 100. The present invention is not intended to limit the control manner of the position-limiting member 203. The position-limiting member 203 may be any member which is able to limit the position of the moving member 201 when the protecting means 200 is in the rest position and release the moving member 201 when the movement of the flat panel electronic device 100 is determined to be the accidental falling. Furthermore, the shape of the position-limiting member 203 shown in FIG. 2A-2B is schematic.

The whole or the major part of the moving member 201 is in the recess 130 of the flat panel electronic device 100 when the protecting means 200 is in the rest position, and the spring 202 is compressed (as shown in FIG. 2A). Thus, the moving member 201 moves outwards automatically due to the biasing force of the spring 202 when the position-limiting member 203 releases the moving member 201 so that the protecting means 200 moves to the protruding position (as shown in FIG. 2B) automatically. The spring 202 is in a free state when the protecting means 200 is in the protruding position. As an example, the moving member 201 may be provided with a notch 201a. The position-limiting member 203 may exactly stretch into the notch 201a to limit the position of the moving member 201 when the protecting means 200 is in the rest position. Alternatively, the position of the moving member 201 may be limited by the position-limiting member 203 in other manner. The position-limiting manner of the moving member 201 and the position-limiting member 203 may be configured by those skilled in the art according to the practical situation.

The structure of the protecting means 200 of the preferred embodiment is simple, and therefore, it hardly brings the extra cost to the manufacture of the flat panel electronic device. Moreover, it has no effect on the existing structure and the aesthetics of the flat panel electronic device due to its small volume.

Preferably, the protecting means 200 comprises a locking member 204. The locking member 204 locks the position of the protecting means 200 when the protecting means 200 is in the protruding position to avoid that the protecting means 200 leaves the protruding position due to the strong impact when the flat panel electronic device 100 falls to the ground. In this way, the protecting means 200 is able to protect the panel effectively. As an example, the locking member 204 may be disposed around the moving member 201, and the end of the locking member 204 away from the moving member 201 may be provided with a spring. The locking member 204 is connected to the side wall of the recess 103 of the flat panel electronic device 100 by the spring. The spring is compressed when the protecting means 200 is in the rest position. The notch 201a of the moving member 201 moves upwards when the protecting means 200 moves to the protruding position. A part of the locking member 204 moves into the notch 201a due to the biasing force of the spring of the locking member 204 as notch 201a moves to the vicinity of the locking member 204, so as to lock the moving member 201 and further lock the protecting means 200 in the protruding position. Alternatively, the locking member 204 may further have other structure which is able to lock the position of the protecting means 200 when the protecting means 200 is in the protruding position.

Preferably, the protecting means 200 may further comprise an unlocking member (not shown). The unlocking member is connected with the locking member 204. The unlocking member may be operated by the user to unlock the position of the protecting means 200. The unlocking member may be any member which is able to unlock the position of the protecting means 200, such as, an electronic element, a mechanical element and a combination of the two. The user may operate the unlocking member to restore the protecting means 200 to the rest position so that the flat panel electronic device 100 may be normally used.

It will be understood that the higher the height of the moving member 201 protruding beyond the panel is, the better the protecting effect is. But the thickness of the flat panel electronic device 100 becomes smaller due to the miniaturization of the flat panel electronic device 110, and thus the height of the moving member 201 is limited. Further, the height of the moving member 201 protruding beyond the panel of the flat panel electronic device 100 is limited. Based on the above consideration, preferably, the height of the protecting means 200 protruding beyond the panel is greater than or equal to 0.5 cm when it in the protruding position.

Preferably, as shown in FIGS. 2A-2B, the top surface of the moving member 201 is a curved surface with a convex centre. In the state that the panel protecting device 120 is mounted to the flat panel electronic device 100, the curved surface is able to seal the recess 130 of the flat panel electronic device 100 when the protecting means 200 is in the rest position. The moving member 201 is able to ensure the sealing of the flat panel electronic device 100, keep dust out in normal use and ensure the aesthetics of the flat panel electronic device 100, when the protecting means 200 is in the rest position. In addition, that the top surface of the moving member 201 is the curved surface with the convex may increase the height of the moving member 201, and further increase the height of the top of the moving member 201 protruding beyond the panel such that the protecting effect is improved when the protecting means 200 is in the protruding position.

According to one embodiment of the present invention, the panel protecting device 120 comprises a plurality of protecting means 200. The plurality of protecting means 200 are all disposed around the panel. In this way, the plurality of protecting means 200 are all in the protruding position when the flat panel electronic device 100 falls accidently to avoid the damage of any parts of the panel caused by contacting with the ground. Furthermore, the panel protecting device 120 further comprises a synchronous means (not shown). The synchronous means is connected with the plurality of protecting means 200 to control the plurality of protecting means 200 to move synchronously. The synchronous means may be any member which is able to control the plurality of protecting means 200 to move synchronously, such as, an electronic element, a mechanical element and a combination of the two. On the one hand, one or more of the plurality of protecting means 200 may not move when the falling distance of the flat panel electronic device is short, which may lead to the damage of the panel. The synchronous means can control the protecting means 200 to move from the rest position to the protruding position synchronously, and thus it may avoid the damage of the panel. On the other hand, when the plurality of protecting means 200 return to the rest position from the protruding position as needed, the synchronous means may avoid that the user operates the protecting means by one by one. Therefore, it improves the convenience.

Preferably, the panel protecting device 120 comprises four protecting means 200. The four protecting means are located at four vertex angles of the panel respectively in an installed state, as shown by the positions of the panel protecting device in FIG. 1. The scheme that four vertex angles are provided with the protecting means respectively is preferable, since it is able to utilize fewer protecting means and smaller protecting means to achieve a better protecting effect.

According to another aspect of the present invention, a flat panel electronic device is further provided. As shown in FIG. 1 and FIGS. 2A-2B, a recess 130 is disposed around the panel 110 of the flat panel electronic device 100, and the flat panel electronic device 100 comprises any kind of the panel protecting device 120 mentioned above. The panel protecting device 120 comprises a sensor (not shown) and a protecting means 200. The sensor is disposed in the flat panel electronic device 100 for detecting one or more of a falling speed, a falling time and a falling distance of the flat panel electronic device in a vertical direction when the flat panel electronic device 100 is only under gravity. The protecting means 200 is mounted in the recess 130 of the flat panel electronic device 100, and the protecting means 200 has a rest position (refers to FIG. 2A) and a protruding position (refers to FIG. 2B). The protecting means 200 is accommodated in the recess 130 of the flat panel electronic device 100 when it is in the rest position and protrudes from the panel 110 when it is in the protruding position. The protecting means 200 moves to the protruding position from the rest position automatically to protect the panel of the flat panel electronic device when one or more of the falling speed, the falling time and the falling distance is great than or equal to the predetermined value. Each component contained in the panel protecting device 120 may refer to the corresponding portion in above description. It is no longer described in details in the present invention for the sake of simplicity.

The panel protecting device of the flat panel electronic device provided by the present invention is able to protrude the protecting means automatically when the movement of the panel protecting device is determined to be the accidental falling, so as to prevent the panel from contacting with the ground and further avoid the damage of the panel.

The present invention has been described by the above-mentioned embodiments. However, it will be understood that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope

What is claimed is:

1. A panel protecting device of a flat panel electronic device, comprising:
    a sensor for detecting one or more of a falling speed, a falling time and a falling distance of the flat panel electronic device in a vertical direction; and
    a protecting means for being mounted around a panel of the flat panel electronic device, the protecting means having a rest position and a protruding position, and the protecting means being accommodated in a recess of the flat panel electronic device when being in the rest position and protruding from the panel when being in the protruding position,
    wherein the protecting means moves to the protruding position from the rest position automatically when the falling distance in the vertical direction is greater than or equal to a predetermined value, and the protecting means comprises:
        a moving member comprising a notch;
        a position-limiting member that is configured to limit the position of the moving member by stretching into the notch to limit the position of the moving member when the protecting means is in the rest position, and release the moving member when the one or more of the falling speed, the falling time and the falling distance in the vertical direction is greater than or equal to the predetermined value; and
        a locking member that moves into the notch to lock the position of the protecting means when the protecting means is in the protruding position.

2. The panel protecting device according to claim 1, wherein the protecting means further comprises a spring, one end of the spring is connected to a bottom of the moving member and the other end of the spring is used for being connected to a bottom of the recess of the flat panel electronic device and the spring is compressed when the protecting means is in the rest position so that the protecting means moves to the protruding position automatically as the moving member is released.

3. The panel protecting device according to claim 1, wherein the predetermined value of the falling distance in the vertical direction is 0.1-0.15 m.

4. The panel protecting device according to claim 1, wherein the sensor is a gravity sensor.

5. The panel protecting device according to claim 1, wherein the height of the protecting means protruding beyond the panel is greater than or equal to 0.5 cm when the protecting means is in the protruding position.

6. The panel protecting device according to claim 1, wherein the panel protecting device comprises a plurality of protecting means and the plurality of protecting means move synchronously.

7. The panel protecting device according to claim 1, wherein the protecting means is further configured to move to the protruding position from the rest position automatically when the falling time is greater than or equal to a corresponding predetermined value.

8. A flat panel electronic device, with a recess disposed around a panel of the flat panel electronic device, the flat panel electronic device comprising a panel protecting device, the panel protecting device including:
    a sensor disposed in the flat panel electronic device for detecting one or more of a falling speed, a falling time and a falling distance of the flat panel electronic device in a vertical direction; and
    a protecting means mounted in the recess of the flat panel electronic device, the protecting means having a rest position and a protruding position, and the protecting means being accommodated in the recess of the flat panel electronic device when being in the rest position and protruding from the panel when being in the protruding position,
    wherein the protecting means moves to the protruding position from the rest position automatically when the falling distance in the vertical direction is greater than or equal to a predetermined value, and the protecting means comprises:
        a moving member comprising a notch;
        a position-limiting member that is configured to limit the position of the moving member by stretching into the notch to limit the position of the moving member when the protecting means is in the rest position, and release the moving member when the one or more of the falling speed, the falling time and the falling distance in the vertical direction is greater than or equal to the predetermined value; and
        a locking member that moves into the notch to lock the position of the protecting means when the protecting means is in the protruding position.

9. The flat panel electronic device according to claim 8, wherein the protecting means further comprises a spring, one end of the spring is connected to a bottom of the moving member and the other end of the spring is connected to a bottom of the recess of the flat panel electronic device and the spring is compressed when the protecting means is in the rest position so that the protecting means moves to the protruding position automatically as the moving member is released.

10. The flat panel electronic device according to claim 8, wherein the sensor is a gravity sensor.

11. The flat panel electronic device according to claim 8, wherein the panel protecting device comprises a plurality of protecting means and the plurality of protecting means move synchronously.

12. The flat panel electronic device according to claim 8, wherein the protecting means is further configured to move to the protruding position from the rest position automatically when the falling time is greater than or equal to a corresponding predetermined value.

* * * * *